3,071,440
PRODUCTION OF TETRABORANE FROM PENTABORANE-11
James L. Boone, Los Angeles, Calif., assignor to American Potash & Chemical Corporation, a corporation of Delaware
No Drawing. Filed Nov. 28, 1958, Ser. No. 776,722
6 Claims. (Cl. 23—204)

This invention relates in general to the production of boron hydrides and more particularly to the production of tetraborane from pentaborane-11.

All the methods heretofore known for converting a volatile boron hydride to another have involved adjustments of the physical conditions governing decomposition-type reactions. For example, the conversion of diborane to pentaborane-9 has customarily been through fast-flow methods at elevated temperatures and when pentaborane-11 has been desired, somewhat higher pressures and lower temperatures have been used. Such methods are described by L. V. McCarty and P. A. Di Giorgio in the Journal of the American Chemical Society, 73, 3138 (1951), and in articles by A. B. Burg and H. I. Schlesinger and by A. B. Burg and F. G. A. Stone appearing respectively in volume 55, p. 4009 (1933), and volume 75, page 228 (1953), of the Journal of the American Chemical Society.

A partial reversal of the last mentioned process, as described in the Burg and Schlesinger article, has been relied upon for the production of tetraborane.

It is therefore an object of this invention to provide a process for borane interconversions through the use of chemical reagents.

It is a further object of this invention to provide a process for the production of tetraborane from pentaborane-11 through a process taking place at low temperatures and under conditions adaptable to large scale production.

Ancillary objects and advantages of this invention, if not specifically set forth, will become apparent during the course of the description which follows.

Broadly, it has been found that pentaborane-11, $B_5H_{11}$, may be hydrolyzed according to the equation $$B_5H_{11} + 3H_2O \rightarrow B_4H_{10} + 2H_2 + B(OH)_3$$

The reaction preferably is effected at temperatures between 0° and 25° C. and at gas pressures of between 15 mm. and 50 mm. Hg. Lower temperatures are not especially practical (though usable) since at least some water must be present. An equilibrium mixture of ice and water apparently favors hydrolysis. Where higher temperatures are used, the contact time may have to be shortened to avoid destruction of the tetraborane. However, temperatures as high as the boiling point of water may be usable if the contact time is sufficiently brief.

More particularly, it has been found that by the partial hydrolysis of pentaborane-11, a high efficiency method of synthesizing tetraborane is provided. Pentaborane-11 may be produced from diborane by the flow process described in the above-mentioned article by Burg and Schlesinger with very little loss of the volatile boranes. The conversion to tetraborane by the methods described here utilizes 80 percent of the boron and 91 percent of the hydridic hydrogen in the pentaborane-11. The method also offers a way to analyze impure pentaborane-11 for pentaborane-9, the proportion of which otherwise is difficult to estimate.

Examples are set forth below for illustrative purposes but are not to be construed as imposing limitations on the scope of the invention other than as set forth in the appended claims.

Example I.—A quantity of 0.509 mmole of $B_5H_{11}$ (including a trace of $B_5H_9$ impurity) was passed into a tube containing ice and held at —78° C. in a Dry Ice bath. The mixture was then warmed to about 0° C. or slightly above. As soon as the ice began to melt, a reaction was observed at the surface and the $B_5H_{11}$ was allowed to contact the water for one minute. A yield of 0.491 mmole of $B_4H_{10}$ and 0.506 mmole of $B(OH)_3$ was secured; 0.017 mmole of $B_5H_9$ impurity was recovered and identified.

Example II.—A quantity of 0.392 mmole of nearly pure $B_5H_{11}$ was reacted with water for about one minute at 0° C. to give 0.360 mmole of $B_4H_{10}$. Also obtained were 0.767 mmole of $H_2$ and 0.366 mmole of $B(OH)_3$. The recovery of $B_5H_9$ was 0.023 mmole.

In both foregoing examples, the tetraborane was thoroughly identified by its physical properties and by hydrolysis yielding 11 $H_2$ and $4B(OH)_3$ per mole. Allowing for the $B_5H_9$ impurity, the yield of tetraborane in the one experiment was 99.8 percent of the theoretical based on the formula set out above and in the other was 97.6 percent.

As is apparent from the foregoing, the process enables the conversion of about 80% of the boron of the pentaborane-11 and 91% of the hydridic hydrogen to the tetraborane since inevitably there is a loss of one boron atom in the conversion of $B_5H_{11}$ to $B_4H_{10}$. This one boron atom combines with water to form boric acid and if the contact time of the pentaborane-11 and water is too extended, part or all of the tetraborane product obtained also will be hydrolyzed to the undesired boric acid. Hence, a proper interrelationship of the contact time and the water temperature is most essential.

For purposes of ascertaining the nature of this relationship, a series of additional tests were run wherein the $B_5H_{11}$ pressure, the water temperature and the contact time were varied and the conversion, as a percentage of the theoretical, was measured. In this procedure, an elongated water cooled (jacketed) glass tube was placed at a slight angle to the horizontal so that gas would pass from one end horizontally and upwardly through the tube. The procedure was to use hydrogen as a carrier gas and to bubble it first through $B_5H_{11}$ to saturate it with a vapor and then pass the vapor-laden gas through the water within the aforementioned tube. The results obtained are tabulated below, where "percent conversion" indicates yield as a percentage of theoretical based on the equation given earlier:

| Run | $B_5H_{11}$ Pressure (P), mm. | Water Temp. (T), °C. | Contact Time (t), min. | Percent Conversion |
|---|---|---|---|---|
| 1 | 16.1 | 20.0 | 0.51 | 74.8 |
| 2 | 52.0 | 5.0 | 0.49 | 70.2 |
| 3 | 16.1 | 5.0 | 0.21 | 72.2 |
| 4 | 52.0 | 20.0 | 0.21 | 73.8 |
| 5 | 33.9 | 12.5 | 0.35 | 70.9 |
| 6 | 33.9 | 12.5 | 0.35 | 75.1 |

It is seen, therefore, that the $B_5H_{11}$ pressure, water temperature and contact time can be varied considerably while yielding results which are acceptable. However, a convenient and preferred contact time is about one minute since a convenient temperature of operation (see Examples I and II) is about 0° C. and the $B_5H_{11}$ pressure is desirably maintained at a fairly low level.

The boron hydride produced by this reaction is useful as a pyrophoric fuel component and may also find use as a reigniter in the event of jet flameouts.

Obviously, many modifications and variations of this invention may be made without departing from the scope thereof and therefore only such limitations should be imposed as are indicated in the appended claims.

I claim:

1. A process for the conversion of pentaborane-11 to tetraborane comprising partially hydrolyzing said pentaborane-11 whereby to yield said tetraborane.

2. A process for the production of tetraborane comprising reacting pentaborane-11 with water.

3. The process of claim 2 wherein the reaction temperature is about 0° C.

4. A process for the production of tetraborane from pentaborane-11 comprising reacting pentaborane-11 with water at a temperature of between 0° C. and 25° C. whereby to produce said tetraborane.

5. A process for the production of tetraborane from pentaborane-11 comprising reacting pentaborane-11 with water at a temperature of between about 0° C. and 25° C. and terminating said reaction before any substantial portion of said tetraborane so produced is hydrolyzed to boric acid.

6. A process for the production of tetraborane from pentaborane-11 comprising reacting pentaborane-11 with water at a temperature of between about 0° C. and 25° C. for a period not in excess of about one minute.

References Cited in the file of this patent

UNITED STATES PATENTS 2,849,290     Faust et al. _____ Aug. 26, 1958

OTHER REFERENCES

Burg et al.: J.A.C.S., vol. 55, 4009 (1933).
Boone et al.: "Journal of the American Chemical Society," vol. 80, pages 1519–1520 (March 20, 1958).